(12) United States Patent
Tsao (10) Patent No.: US 7,457,270 B2
(45) Date of Patent: Nov. 25, 2008

(54) RE-ALLOCATION METHOD FOR A DISTRIBUTED GGSN SYSTEM

(75) Inventor: Shiao-Li Tsao, Taipei (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1175 days.

(21) Appl. No.: 10/215,169

(22) Filed: Aug. 8, 2002

(65) Prior Publication Data
US 2003/0169712 A1 Sep. 11, 2003

(30) Foreign Application Priority Data
Mar. 5, 2002 (TW) .............................. 91104075 A (51) Int. Cl.
*H04L 12/50* (2006.01)
(52) U.S. Cl. .................... 370/338; 455/455; 370/310.2; 370/401
(58) Field of Classification Search .................. None
See application file for complete search history.

(56) References Cited

U.S. PATENT DOCUMENTS

| | | | |
|---|---|---|---|
| 6,233,458 B1 * | 5/2001 | Haumont et al. ............ 455/445 |
| 6,904,025 B1 * | 6/2005 | Madour et al. .............. 370/328 |
| 7,068,599 B1 * | 6/2006 | Jiang et al. ................ 370/230.1 |
| 7,142,528 B2 * | 11/2006 | Tanimoto et al. ............ 370/338 |
| 7,197,573 B1 * | 3/2007 | Jacobson et al. ............ 709/239 |
| 2002/0032029 A1 * | 3/2002 | Angin ........................ 455/428 |
| 2002/0136226 A1 * | 9/2002 | Christoffel et al. .......... 370/401 |
| 2003/0117983 A1 * | 6/2003 | Ton et al. .................... 370/338 |
| 2004/0266440 A1 * | 12/2004 | Fuchs et al. ................. 455/445 |
| 2005/0070283 A1 * | 3/2005 | Hashimoto et al. ....... 455/435.1 |

* cited by examiner

*Primary Examiner*—Chi H. Pham
*Assistant Examiner*—Phuc Tran
(74) *Attorney, Agent, or Firm*—Fish & Richardson P.C.

(57) ABSTRACT

A re-allocation method for a distributed GGSN system. The re-allocation method includes a GGSN controller to determine a GGSN re-allocation for at least one mobile station. The GGSN re-allocation for the mobile station is performed by a GGSN or a SGSN originally connected to the mobile station, thereby enabling GGSN(s) with dynamic load balance and improving the system scalability.

13 Claims, 9 Drawing Sheets

RE-ALLOCATION METHOD FOR A DISTRIBUTED GGSN SYSTEM

Pursuant to 35 U.S.C. § 119(a)-(d), this application claims priority from Taiwanese application No. 91104075, filed on Mar. 5, 2002.

BACKGROUND OF THE INVENTION

1. Field of the Invention

The invention relates to a re-allocation method for a distributed Gateway GPRS Support Node (GGSN) system, which uses a GGSN controller to determine a GGSN re-allocation for a mobile station and performs the GGSN re-allocation by a GGSN or an SGSN corresponding to the mobile station, thereby enabling a GGSN system with dynamical load balancing and improving the system scalability.

2. Description of Related Art

GPRS networks are configured by packet switching based on the well-known GSM architecture. Accordingly, GPRS networks are compatible with GSM networks. Packet switching allows many people on-line to share network resources in a limited bandwidth. Further, encoding techniques have considerably improved, greatly increasing network data throughput. Thus, multimedia data transmission in a network is widely used.

Figure 1:
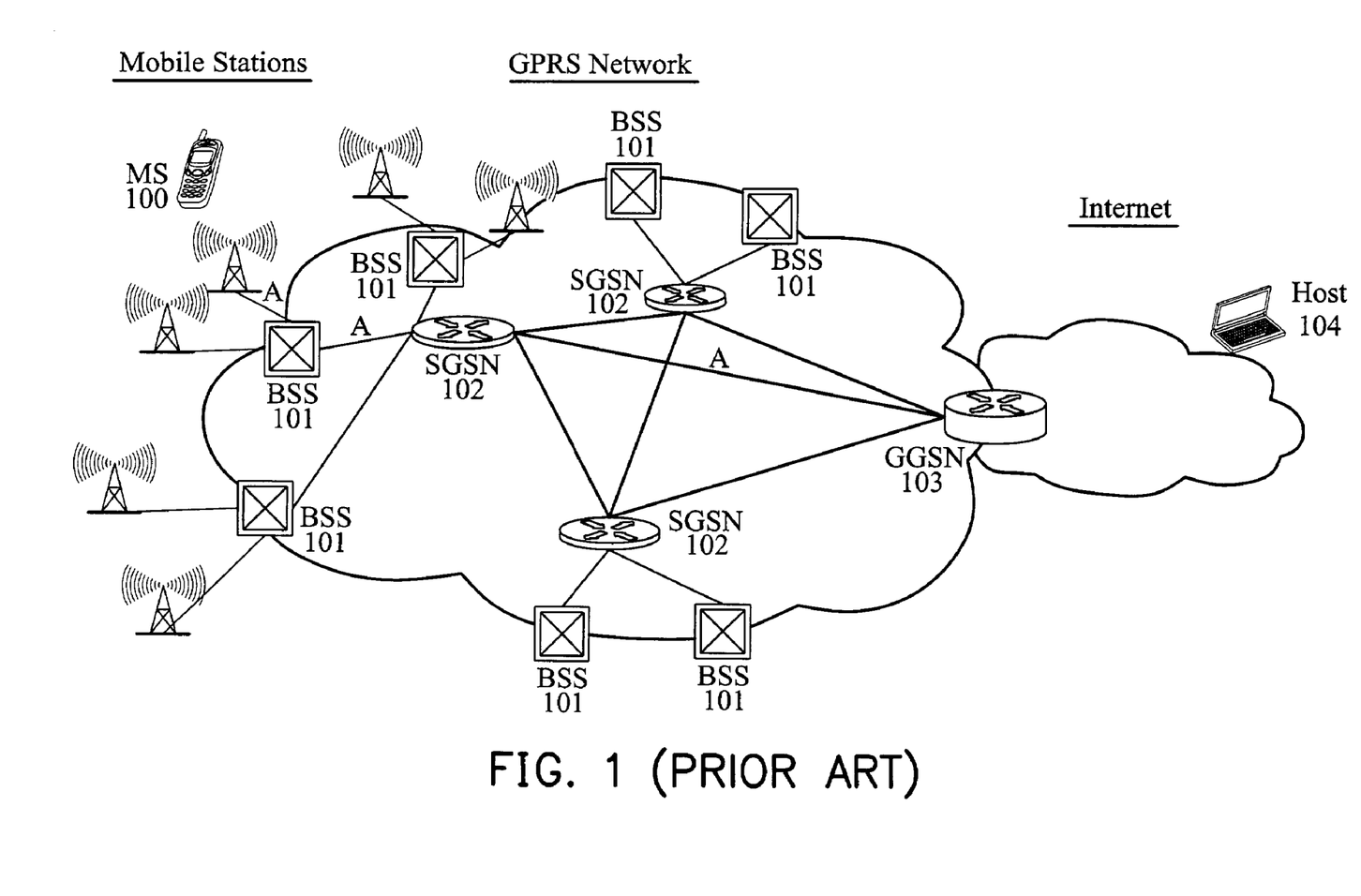
FIG. 1 is a schematic diagram of a typical GPRS network.

FIG. 1 depicts an overall architecture of a typical GPRS network. In FIG. 1, the typical GPRS network belonging to Public Land Mobile Network (PLMN) includes a mobile station 100, multiple Base Station Subsystems (BSSs) 101, multiple SGSNs 102, a GGSN 103 and a host 104. In practice, the configuration can be varied as necessary, and is not limited to a mobile station 100, a GGSN 103 and a host 104. For the purpose of description, only a mobile station 100, a GGSN 103 and a host 104 are described.

As shown in FIG. 1, the mobile station 100 can access outside networks such as Internet or X.25 network via a path A passing through BSS 101, SGSN 102 and the GGSN 103. Each BSS 101 is responsible to control radio access and forwards data to GPRS core network. Each SGSN is in charge of relaying packets from radio networks to core network. Moreover, each SGSN handles mobility management (GMM) and session management (SM) in the GPRS network. For example, it handles different routing areas (RAs) and various mobiles' communication, including recording current mobile positions and completing packet accesses. The GGSN 103 serves as a gateway to access outside networks such as Internet or X.25 in order to send packets to a remote host such as the host 104. According to GPRS specifications, the initiation procedure of GPRS service includes powering on mobile stations and attaching powered-on mobile stations to the GPRS network. Attachment of a mobile station is to request a SGSN 102 to build up mobility management context in order to locate the mobile station. Once the mobile station has data to send or someone wants to send data to the mobile station, the mobile station will initiate or be asked to initiate a Packet Data Protocol (PDP) context activation. The PDP context activation asks the SGSN 102 to set up packet routing information on the SGSN 102 itself and the GGSN 103 so that the packets to/from the mobile station can be routed properly in the GPRS network. The PDP context information includes QoS profiles, access network information and corresponding GGSN IP addresses. The PDP context is released after the mobile station has deactivated its service. Based on design philosophy, GGSN selection is only performed at activation time. For example, when the mobile station 100 activates services and then starts its packet delivery/receiving, operators of the GPRS system can assign a GGSN 103 with the lowest load to the mobile station 100 based on Access Point Network (APN) or other GGSN selection policies. The assigned GGSN 103 is permanent once the GGSN 103 is assigned to the mobile station 100 until the PDP context of the mobile station 100 is deactivated. Therefore, all services to the mobile station 100 are completed by the GGSN 103. In practice, packet data is delivered in bursts For example, the operator may assign the same number of mobile stations to two GGSNs 103. As more and more subscribers request packet service in GPRS or future telecommunication networks, it becomes necessary to allocate a pool of GGSNs in PLMN to serve users. However, due to the permanent relation of a mobile station to an assigned GGSN and in practice, packet data is delivered in bursts, GGSNs cannot perform load balance even the number of serving MSs are the same. Therefore, in the typical GPRS network, one or more of GGSNs 103 may create a bottleneck.

SUMMARY OF THE INVENTION

Accordingly, an object of the invention is to provide a re-allocation method for a GGSN system, which features dynamical load adjustment.

Another object of the invention is to provide a re-allocation method for a GGSN system, which relates new mechanisms based on existing GPRS system so that a pool of GGSNs can exchange service of mobile stations dynamically without breaking connections, thereby effectively avoiding service interruption from GGSN re-allocation performance.

The invention provides a re-allocation method for a GGSN system, including using a GGSN controller to determine a GGSN re-allocation for a mobile station; and performing the GGSN re-allocation by a GGSN or an SGSN corresponding to the mobile station. Thus, the present invention enables GGSN with dynamical load balancing and improves the scalability of the GGSN system.

DETAILED DESCRIPTION OF THE INVENTION

The following numbers denote the same elements throughout the description and drawings.

Figure 2:
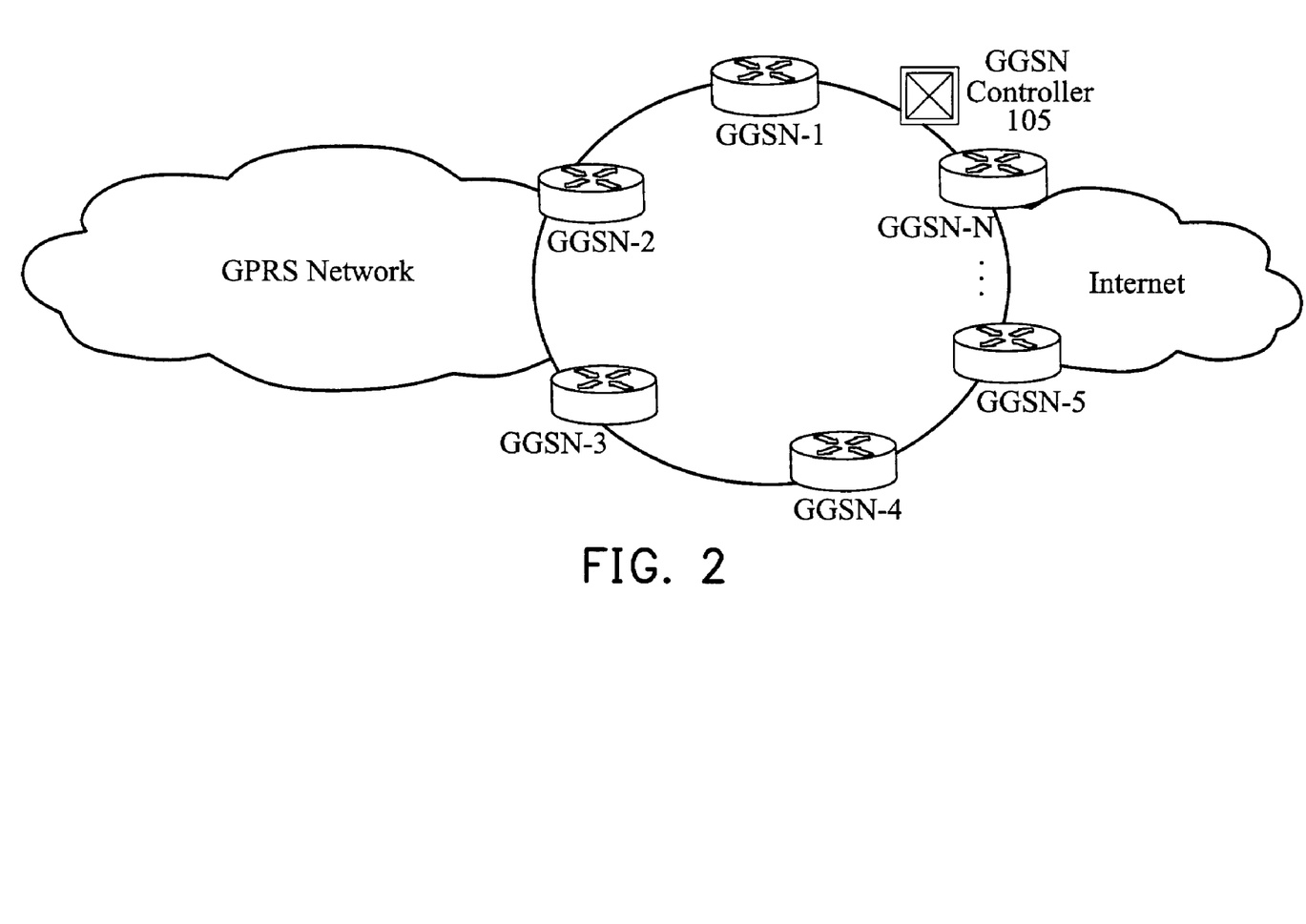
FIG. 2 is a schematic diagram of a distributed GGSN system according to the invention.

FIG. 2 is a schematic diagram of a distributed GGSN system according to the invention. As shown in FIG. 2, a number of GGSNs (GGSN-1 to GGSN-N) connect to a GGSN network to form the distributed GGSN system. A GGSN controller 105, not shown in the prior art, is introduced to monitor and control the load of all GGSNs from GGSN-1 to GGSN-N and the updated state of all SGSNs (FIG. 3).

Figure 3:
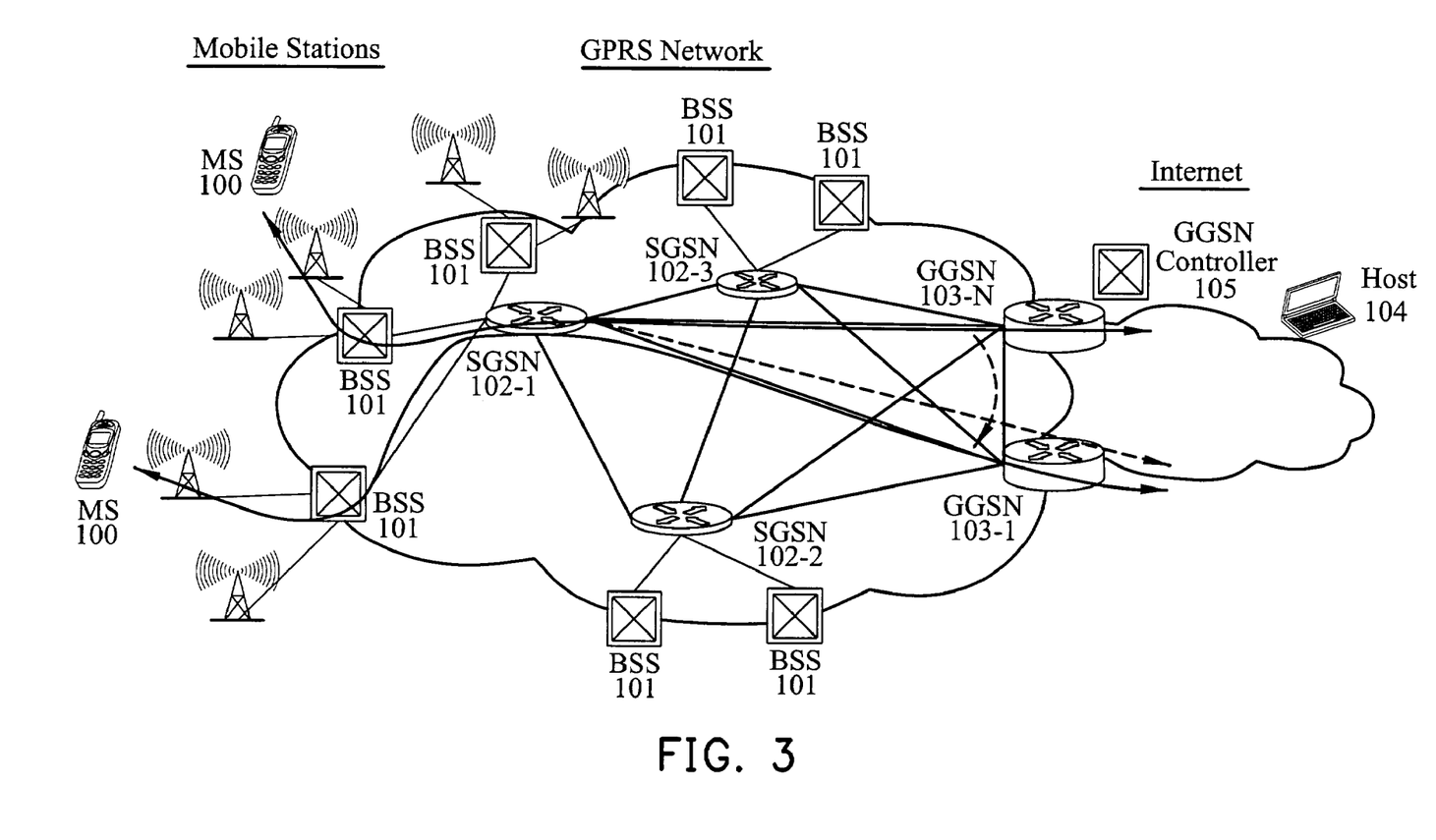
FIG. 3 is a schematic diagram of the distributed GGSN system in a GPRS network according to the invention.

FIG. 3 is a schematic diagram of the distributed GGSN system in a GPRS network according to the invention. As shown in FIG. 3, in the GPRS system with the distributed GGSNs, a mobile station 100 can be assigned to a specific GGSN such as 103-N statically and also be redirected to another GGSN such as 103-N dynamically. The GGSN controller can determine that the mobile station 100 is connected to the GGSN 103-1 or the GGSN 103-N by monitoring and controlling the load of GGSNs.

Figure 4:
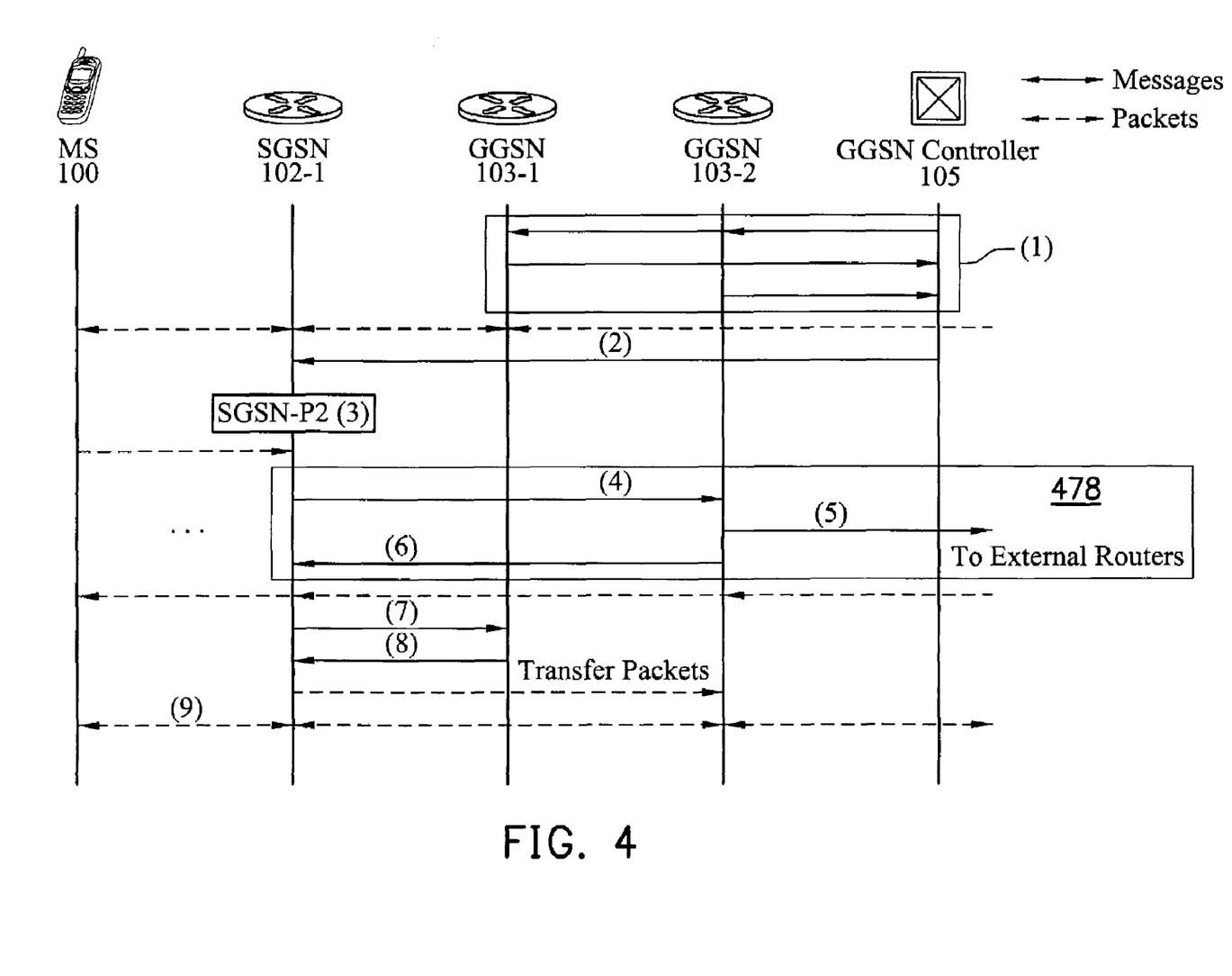
FIG. 4 is a flowchart of a first embodiment according to the invention.
Figure 5:
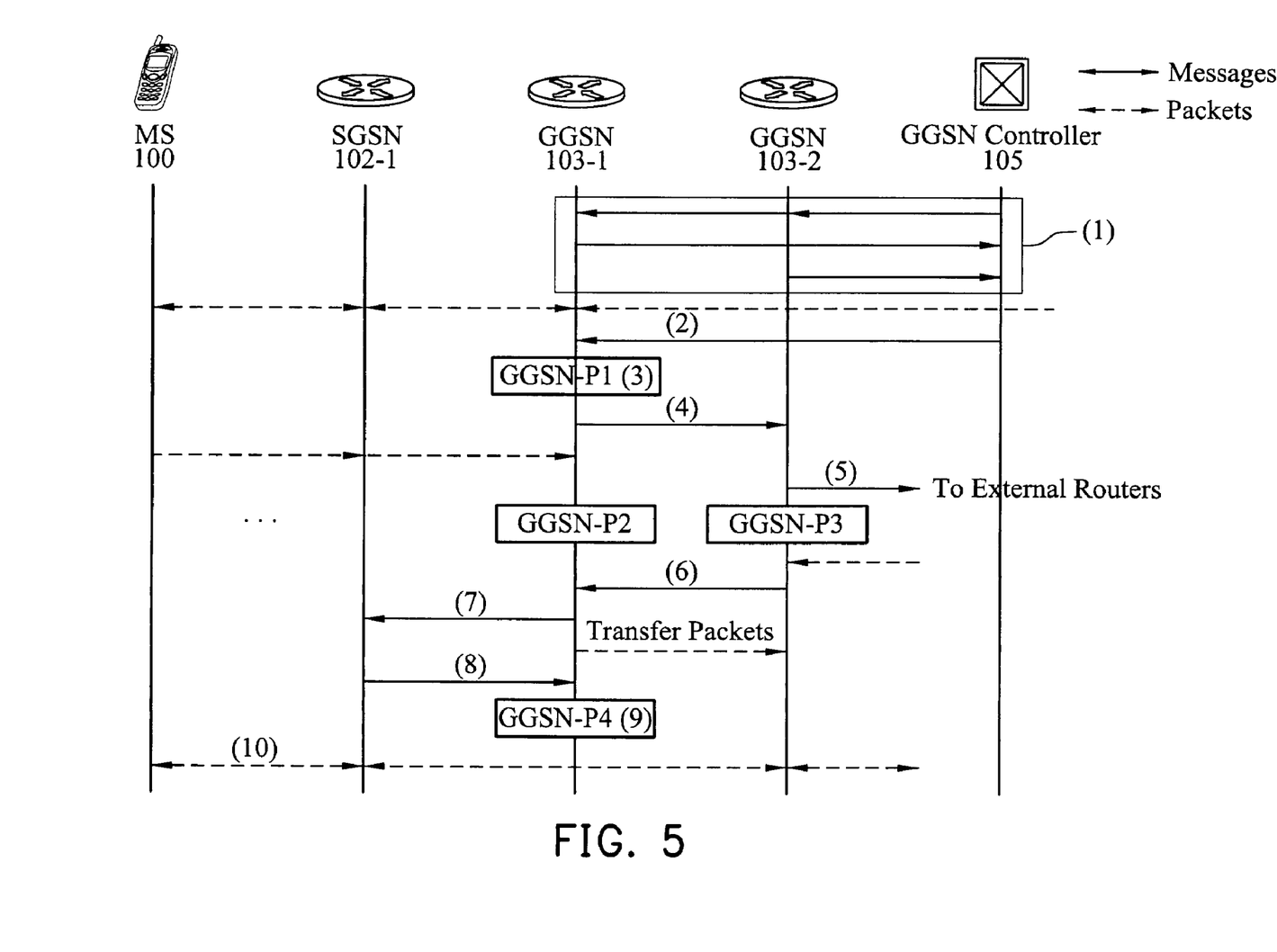
FIG. 5 is a flowchart of a second embodiment according to the invention.

FIGS. 4 and 5 depict two types of mobile station redirect procedures in the same routing area. In FIGS. 4 and 5, the redirect procedures involve the devices MS 100, SGSN 102-1, GGSN 103-1, GGSN 103-2 and the GGSN controller 105. Hereinafter, dotted lines denote data packets and solid lines denote signaling messages. The GGSN controller 105 can be an independent node logically or physically collocated with GGSN 103-1 or SGSN 102-1 physically. One of the two redirect procedures for mobile stations such as MS 100 is initiated by a corresponding SGSN such as SGSN 102-1 (FIG. 4). The other is initiated by a corresponding GGSN such as GGSN 103-1 (FIG. 5).

FIG. 4 shows the case that SGSN 102-1 initiates the redirect procedure. The GGSN controller 105 first determines if overload happens based on response speed from GGSNs. For this purpose, the GGSN controller 105 can send a GGSN Measurement Report Request to GGSN 103 or ask GGSN 103 to send their load information periodically (step 1) to monitor the load of GGSN 103. Once the GGSN 105 notices GGSNs are overloaded, it calculates an MS list to be redirected, and then sends a GGSN Re-allocation Request to SGSN 102-1 that handles these mobile stations (step 2). SGSN 102-1 gets the GGSN Re-allocation Request from original GGSN, say GGSN 103-1, and enters SGSN-P2 state (step 3). In SGSN-P2 state, SGSN 102-1 first creates a standard Create PDP Context to new GGSN, for example GGSN 103-2 (steps 4 and 6), and then initiates a standard Delete PDP Context to GGSN 103-1 (steps 7 and 8). Following the Create PDP Context procedure, the GGSN data of GGSN-in-Use field will be modified in SGSN 102-1 and data packets will be forwarded to GGSN 103-2 (step 9) after the GGSN-in-Use field is updated. While GGSN 103-2 gets a Create PDP Context with a new GGSN (GGSN 103-2) IP, it sends a Proxy ARP (step 5) to update an external router's routing table (not shown). Address Resolution Protocol (ARP) can find out the MAC address of a host with the desired IP address. Thus, the purpose of sending the Proxy ARP to the external router is to associate the mobile station's IP address with GGSN 103-2's MAC address. This Proxy ARP tells associated routers that incoming packets should henceforth be forwarded to GGSN 103-2, not GGSN 103-1. Packets between GGSN and SGSN will not be lost since any SGSN and GGSN will store the packets when they issue/get the modified PDP Context and forward the packets to a new GGSN after the command is completed. Detailed message flows and procedures are:

Step 1, a GGSN controller collects GGSN information and decides to perform a mobile station redirect procedure.

Step 2, the GGSN controller calculates a list of mobile stations and their destination GGSNs and sends a GGSN Re-allocation Request to a corresponding SGSN.

Step 3, the SGSN receives the GGSN Re-allocation Request from the GGSN controller and gets PDP contexts of the mobile stations that are redirected.

Step 4, the SGSN sends a Create PDP Context Request to new GGSNs and waits for GGSN responses.

Step 5, new GGSNs receive the Create PDP Context Request and send a Proxy ARP to external routers to update mapping tables of associated MAC and IP addresses.

Step 6, new GGSNs respond to the SGSN with a Create PDP Context Response.

Step 7, the SGSN receives the Create PDP Context Response from new GGSNs and sends a Delete PDP Context Request to original GGSNs.

Step 8, original GGSNs delete their PDP context and respond to the SGSN with a Delete PDP Context Response.

Step 9, the SGSN initiating the mobile station redirect is completed and packets are forwarded to new GGSNs.

As shown in FIG. 5, a mobile station redirect procedure is initiated by a corresponding GGSN. The GGSN controller 105 can issue the redirect command to GGSN 103-1 or GGSN 103-1 initiates the redirect procedure according to discovery mechanism of peer GGSN overloading. The merit of this is that the effort expended by the SGSN can be reduced. The overload discovery and redirect decision can be completely handled by the distributed system. The GGSN controller 105 collects GGSN load information and makes the mobile redirect decision (step 1). The GGSN controller 105 sends an MS Redirect Request with a list of mobile stations to a specific GGSN (step 2), say GGSN 103-1. Once GGSN 103-1 gets the MS Redirect Request, it enters a GGSN-P1 state (step 3). In the GGSN-P1 state, GGSN 103-1 gets the information of MS 100 and a destination GGSN, say GGSN 103-2, from the request message. GGSN 103-1 sends a Transfer PDP Context Request to GGSN 103-2. This message is to transfer whole PDP context from GGSN 103-1 to GGSN 103-2 so that GGSN 103-2 can continue serving the mobile station MS 100.

Once GGSN 103-1 sends the Transfer PDP Context Request, it enters a GGSN-P2 state (step 4). In the GGSN-P2 state, GGSN 103-1 buffers packets of MS 100, from SGSN 102-1. Meanwhile, GGSN 103-2 gets the Transfer PDP Context Request and realizes that MS 100's services will be handed over to GGSN 103-2. GGSN 103-2 sends a Proxy ARP (step 5) to external routers (not shown) in order to associate GGSN 103-2's MAC address with MS 100's IP address. The Proxy ARP tells external routers that coming packets should henceforth be forwarded to GGSN 103-2, not to GGSN 103-1. GGSN 103-2 enters a GGSN-P3 state. In the GGSN-P3 state, GGSN 103-2 allocates a new PDP context for the redirected mobile stations such as MS 100 and sends a Transfer PDP Context Response to GGSN 103-1 (step 6). After GGSN 103-1 gets the Transfer PDP Context Response from GGSN 103-2, it sends an Update GGSN Info Request to SGSN 102-1 that handles MS 100 (step 7). The Update GGSN Info Request includes asking for IP address of GGSN 103-2. GGSN 103-1 can start to forward the buffered packets to GGSN 103-2. Once SGSN 102-1 gets the Update GGSN Info Request, it modifies GGSN-in-Use field to GGSN 103-2 and data packets will be forwarded to GGSN 103-2 (step 10) after the GGSN-in-Use field is updated. SGSN 102-1 should send an Update GGSN Info Response to GGSN 103-1 (step 8) so that GGSN 103-1 can release the PDP context for MS 100. After the Update GGSN Info Response is sent, the procedure enters a GGSN-P4 state (step 9). In the GGSN-P4 state, GGSN 103-1 will delete the PDP context of MS 100. Detailed message flows and procedures are:

Step 1, a GGSN controller collects GGSN information and decides to perform a mobile station redirect procedure.

Step 2, the GGSN controller calculates a list of mobile stations and their destination GGSNs and sends an MS Redirect Request to source GGSNs.

Step 3, source GGSNs receive the MS Redirect Request from the GGSN controller and get a list of mobile stations to be redirected.

Step 4, source GGSNs send a Transfer PDP Context Request to destination GGSNs and buffer packets from a corresponding SGSN.

Step 5, destination GGSNs receive the Transfer PDP Context Request and send a Proxy ARP to external routers to update mapping tables of associated MAC and IP addresses.

Step 6, destination GGSNs return a Transfer PDP Context Response to the corresponding SGSN.

Step 7, source GGSNs receive an Update GGSN Information Response from the corresponding SGSN and start to forward packets to destination GGSNs.

Step 8, destination GGSNs update GGSN-in-Use fields in their PDP context and return a Update GGSN Information Response to source GGSNs.

Step 9, source GGSNs receive the Update GGSN Information Response and delete their PDP context.

Step 10, the GGSN's initiation of the mobile station redirect is completed and packets are forwarded to new GGSNs.

Figure 6:
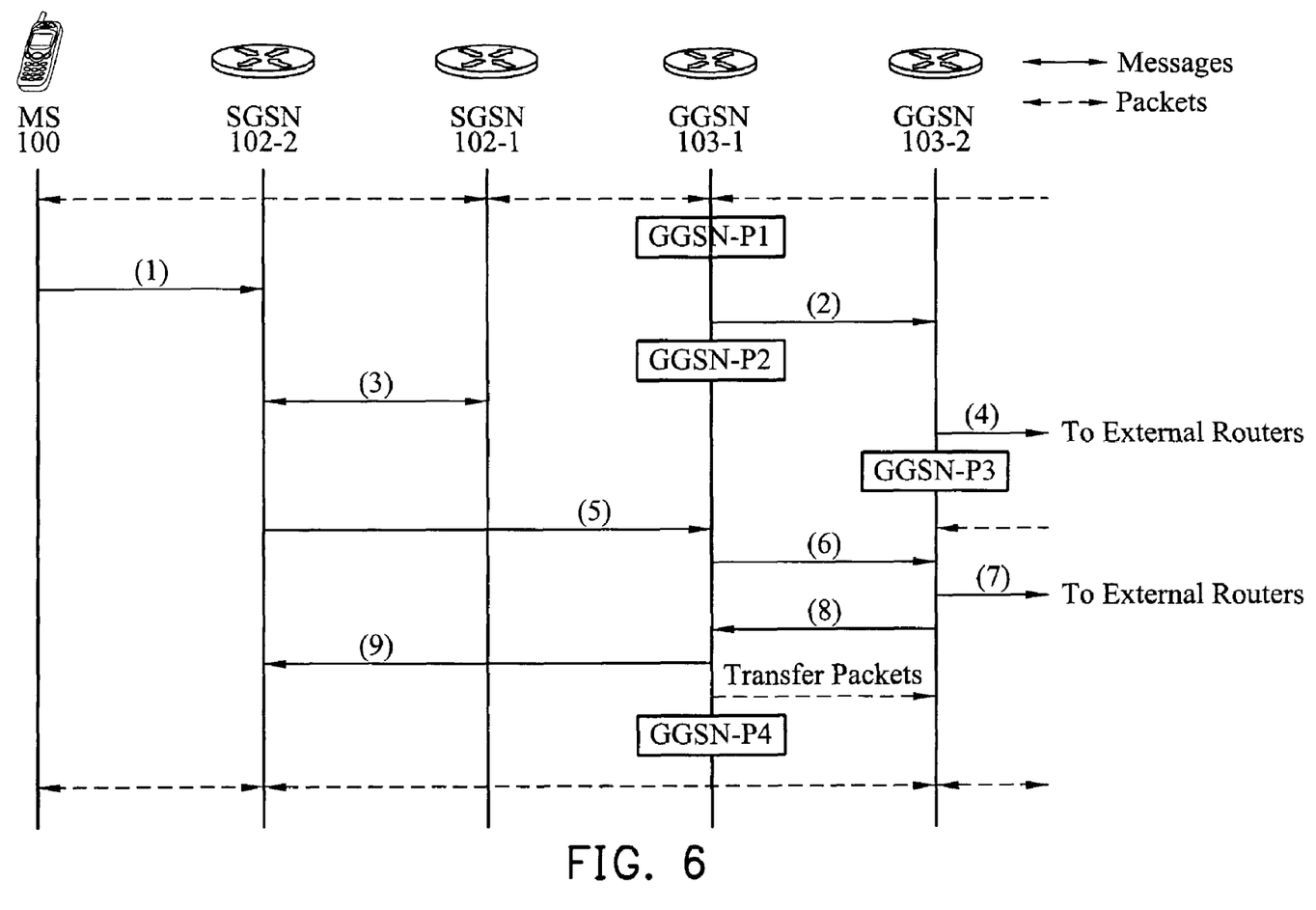
FIG. 6 is a flowchart of a third embodiment according to the invention.
Figure 7:
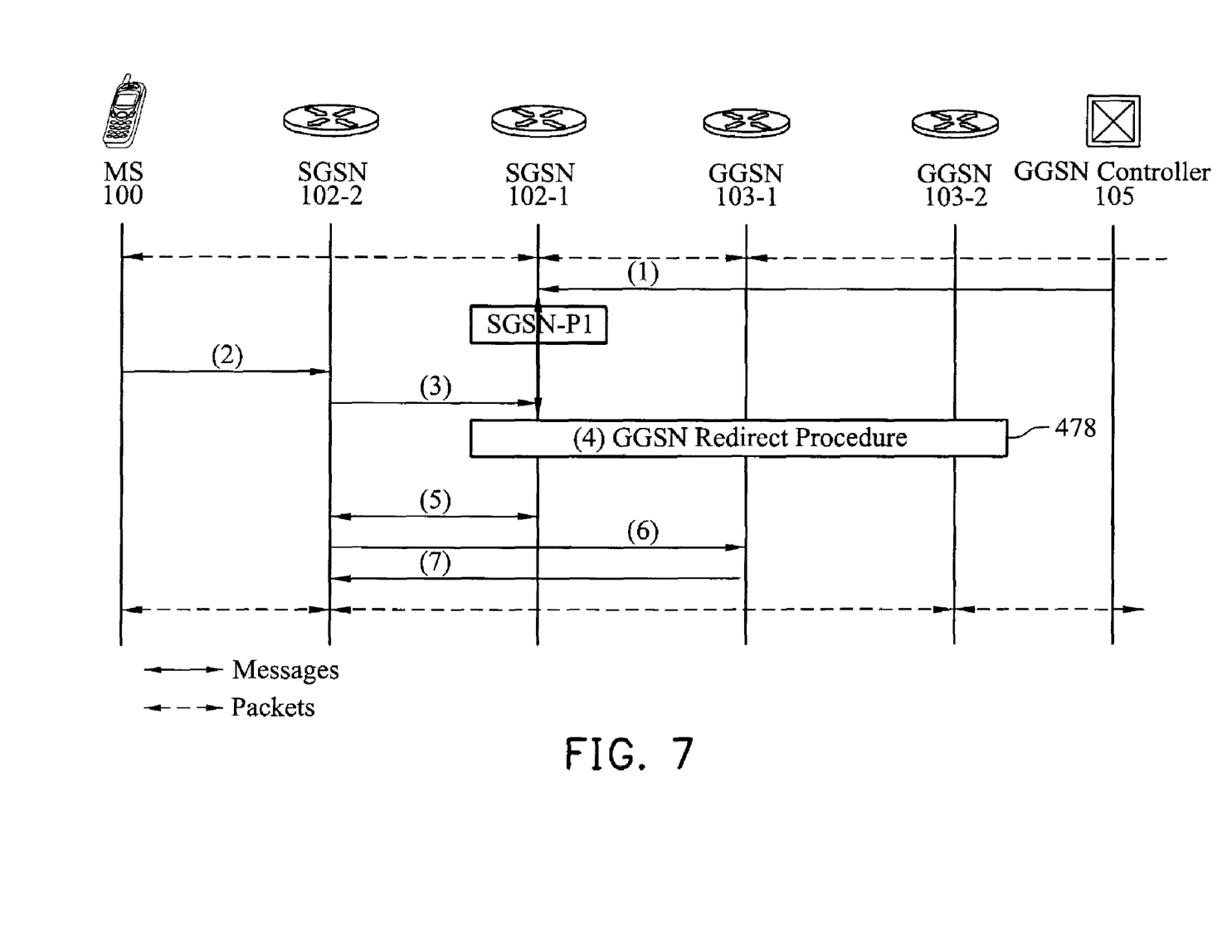
FIG. 7 is a flowchart of a fourth embodiment according to the invention.
Figure 8:
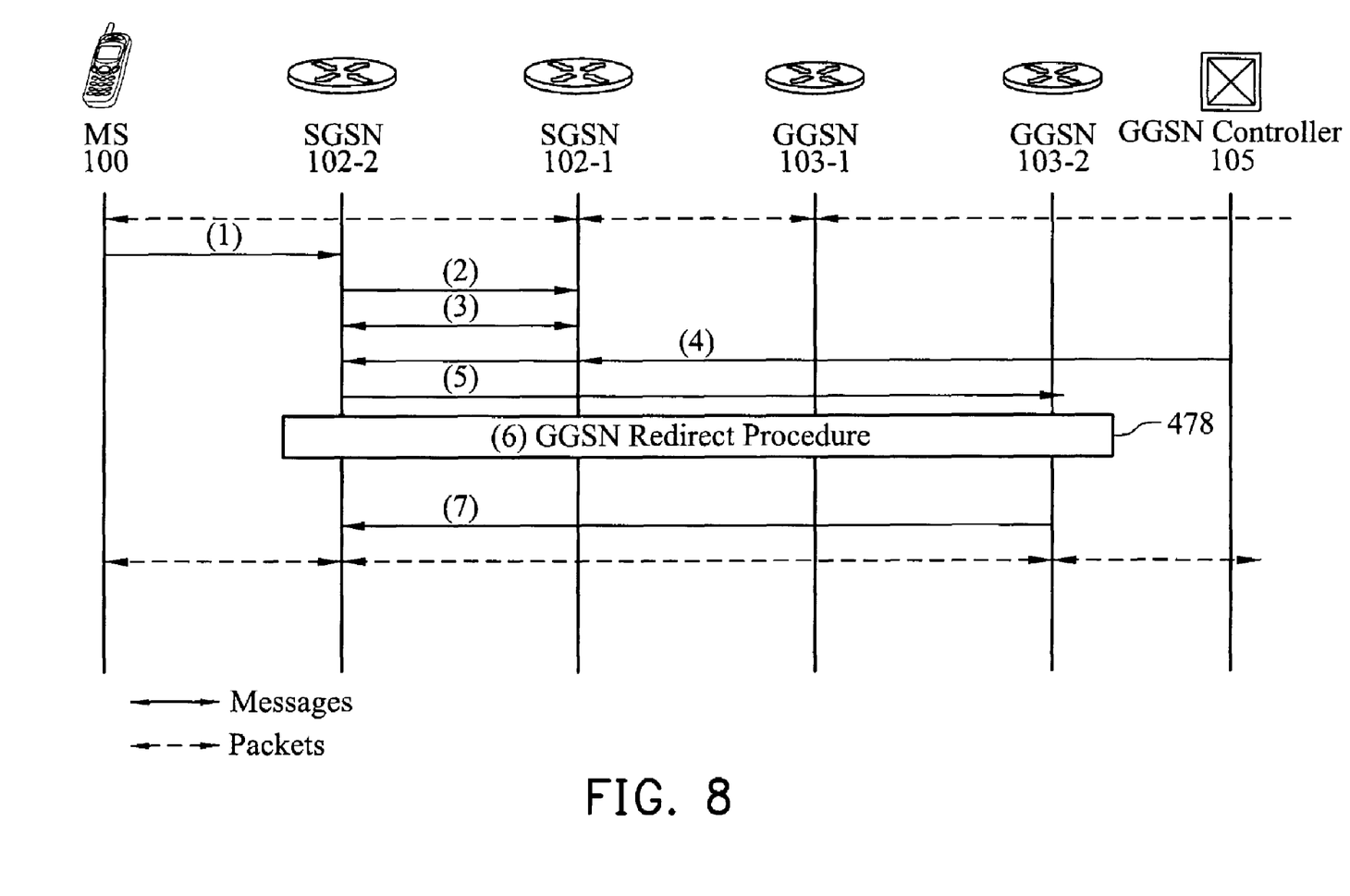
FIG. 8 is a flowchart of a fifth embodiment according to the invention.

FIGS. 6, 7 and 8 are three possible scenarios that may happen during an MS redirect. FIG. 6 shows a scenario in which GGSN 103-1 is performing MS 100's redirect procedure while Inter SGSN routing is updated. When MS 100 moves from a routing area belonging to SGSN 102-1 to a routing area belonging to SGSN 102-2, SGSN 102-2 gets the latest GGSN IP address and the new GGSN has information regarding SGSN 102-2. As shown in FIG. 6, when MS 100 sends a RAn Update Request to SGSN 102-2 (step 1), GGSN 103-1 first sends a Transfer PDP Context Request to GGSN 103-2 (step 2) according to the earlier received MS Redirect Request shown in FIG. 5 and enters a GGSN-P2 state. Signals of SGSN Context Request/Response/Acknowledge are sent between SGSN 102-2 and SGSN 102-1 (step 3) so that SGSN 102-2 can take over MS 100's services after SGSN 102-2 receives the SGSN Context Acknowledgement. GGSN 103-2 sends a Proxy ARP (step 4) to external routers (not shown) in order to associate GGSN 103-2's MAC address with MS 100's IP address. The Proxy ARP is to tell external routers that coming packets should henceforth be forwarded to GGSN 103-2, not to GGSN 103-1. GGSN 103-2 enters a GGSN-P3 state. However, because MS 100 may change to a different routing area when performing the redirect procedure, GGSN 103-1 may receive a Create PDP Context Request (step 5) from SGSN 102-2 before GGSN 103-1 receives GGSN 103-2's response. Using the Create PDP Context Request sets up new PDP context associated with SGSN 102-2's information in GGSN 103-1 after MS 100 roams to SGSN 102-2. Since MS 100 is redirected to GGSN 103-2, GGSN 103-1 has the responsibility to tell GGSN 103-2 the new SGSN 102-2's information. Any Create PDP Context Request sent to GGSN 103-1 before receiving a Transfer PDP Context Response from GGSN 103-2 has to resend the Transfer PDP Context Request to GGSN 103-2 again (step 6). As such, GGSN 103-2 ignores the previous request and sends the Proxy ARP to external routers again (step 7). The remaining procedures (after step 7) are identical to FIG. 5 from step 6 to the end.

FIG. 7 shows a mobile station redirect procedure initiated by SGSN 102-1. As shown in FIG. 7, when SGSN 102-1 receives a GGSN Re-allocation Request from the GGSN controller 105 (step 1) and enters a SGSN-P1 state, MS 100 concurrently moves to a new routing area and sends an RAn Update Request to SGSN 102-2 (step 2). SGSN 102-2 then sends an SGSN Context Request to SGSN 102-1 (step 3) so that the procedure 478 (i.e., steps 4-6) in FIG. 4 can be performed (step 4) after SGSN 102-1 receives the SGSN Context Request from SGSN 102-2 and the GGSN Re-allocation Request from the GGSN controller 105. If SGSN 102-1 does not start the procedure 478, SGSN 102-1 has to send an up-to-date PDP context to GGSN 103-2 (not shown). The remaining steps (after step 4) are identical to FIG. 4 from step 6 to the end. However, as shown in FIG. 8, SGSN 102-1 may receive a GGSN Re-allocation Request (step 4) from the GGSN controller 105 during the Inter SGSN routing areas update procedure (steps 1-3), and may not update the latest SGSN information to GGSN 103-2. In this case, SGSN 102-2 should send the Create PDP Context Request again to GGSN 103-2 in order to refresh the PDP context in GGSN 103-2 (step 5). After that, the procedure 478 (step 6) and the following are performed. The procedure 478 is the same as steps 4-6 in FIG. 4.

Figure 9:
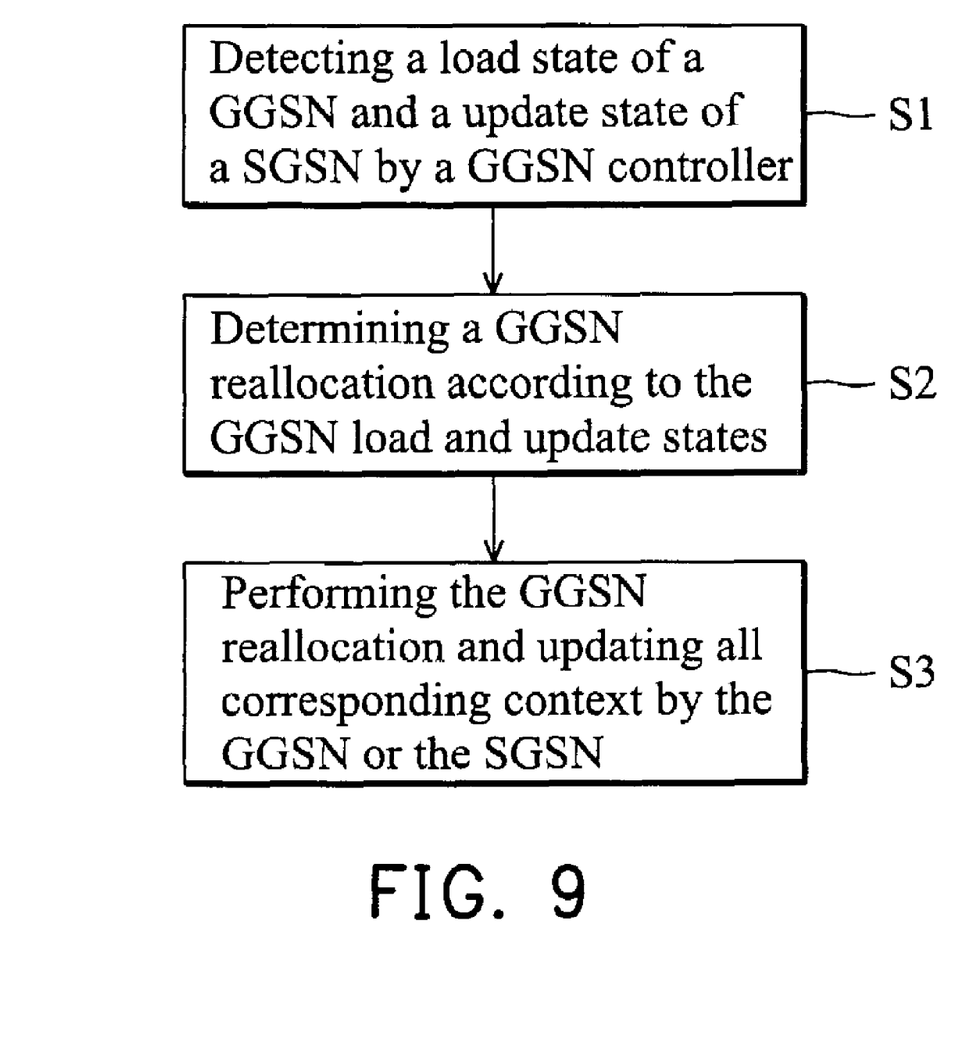
FIG. 9 depicts a flowchart of the GGSN re-allocation according to the invention.

Summarily, as shown in FIG. 9, the re-allocation method for a distributed GGSN system according to the invention includes: detecting a load state of a GGSN and an Update state of a SGSN by a GGSN controller (S1); determining a GGSN re-allocation according to the GGSN load and update states (S2); and performing the GGSN re-allocation and updating all corresponding context by the SGSN or the GGSN (step 3). The corresponding context can be a mobile station list, a PDP context, an SGSN context.

The invention is not limited to the illustrated example in GPRS network, but can be applied to UMTS, 3G and any mobile telecommunication network.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A resource re-allocation method for a distributed Gateway General Packet Radio Service Support Node (GGSN) system, the distributed GGSN system collocating with a General Packet Radio Service (GPRS) network, the GPRS network having a GGSN controller, mobile stations, a new GGSN, an original GGSN, a new Serving General Packet Radio Service Support Node (SGSN) and an original SGSN, the resource re-allocation method comprising:

detecting a load state of the original GGSN and the Update state of mobile stations on the original SGSN by the GGSN controller;
 determining a GGSN re-allocation according to the load and update states; and
 performing the GGSN re-allocation.

2. A resource re-allocation method for a distributed GSSN (Gateway General Packet Radio Service Support Node) system, the distributed GGSN system collating with a GPRS (General Packet Radio Service) network, the GPRS network having a GGSN controller, mobile stations, a new GGSN, an original GGSN, a new SGSN (Serving General Packet Radio Service Support Node) and an original SGSN, the resource re-allocation method comprising:

detecting a load state of the original GGSN and the update state of mobile stations on the original SGSN by the GGSN controller, wherein the load and update states include a first status for the original GGSN overload and the mobile stations on the original SGSN without requiring a-routing area update, and a second status for the original GGSN overload and the status of mobile stations on the original SGSN requiring an updating routing area;

determining a GGSN re-allocation according to the load and update states; and performing the GGSN re-allocation.

3. The resource re-allocation method of claim 2, wherein in the first status, the performing the GGSN re-allocation includes a mobile station redirect initiation.

4. The resource re-allocation method of claim 3, wherein the mobile station redirect initiation is performed by the original SGSN.

5. The resource re-allocation method of claim 4, wherein the mobile station redirect initiation performed by the original SGSN comprises:

step 1, the GGSN controller collecting GGSN information and deciding to perform a mobile station redirect procedure;

step 2, the GGSN controller generating a list of mobile stations and their corresponding GGSNs and sending GGSN Re-allocation Requests to the original SGSNs;

step 3, the original SGSN receiving the GGSN Re-allocation Request from the GGSN controller and receiving Packet Data Protocol (PDP) contexts of the mobile stations that are redirected;

step 4, the original SGSN sending a Create PDP Context Request to the new GGSN and waiting for a response;

step 5, the new GGSN receiving the Create PDP Context Request and sending a Proxy ARP to external routers to update mapping tables of associated MAC and IP addresses;

step 6, the new GGSN returning a Create PDP Context Response to the original SGSN;

step 7, the original SGSN receiving the Create PDP Context Response from the new GGSN and sending a Delete PDP Context Request to the original GGSN;

step 8, the original GGSN deleting its PDP context and returning a Delete PDP Context Response to the original SGSN; and step 9, the original SGSN's initiation of the mobile station redirect being completed and packets being forwarded to the new GGSN.

6. The resource re-allocation method of claim 3, wherein the mobile station redirect initiation is performed by the original GGSN.

7. The resource re-allocation method of claim 6, wherein the mobile station redirect initiation performed by the original GGSN comprises:

step 1, the GGSN controller collecting GGSN information and deciding to perform a mobile station redirect procedure;

step 2, the GGSN controller generating a list of mobile stations and their corresponding GGSNs and sending an MS Redirect Requests to the original GGSNs;

step 3, the original GGSN receiving the MS Redirect Request from the GGSN controller and getting a list of mobile stations to be redirected;

step 4, the original GGSN sending a Transfer Packet Data Protocol (Transfer PDP) Context Request to the new GGSN and buffering packets from the original SGSN;

step 5, the new GGSN receiving the Transfer PDP Context Request and sending a Proxy ARP to external routers to update mapping tables of associated MAC and IP addresses;

step 6, the new GGSN returning a Transfer PDP Context Response to the corresponding SGSN;

step 7, the original GGSN receiving an Update GGSN Information Response to the original SGSN and starting to forward packets to the new GGSN;

step 8, the new GGSN updating GGSN-in-Use field in its PDP context and returning an Update GGSN Information Response to the original GGSN;

step 9, the original GGSN receiving the Update GGSN Information Response and deleting their PDP context; and step 10, the original GGSN's initiation of the mobile station redirect being completed and packets being forwarded to the new GGSN.

8. The resource re-allocation method of claim 2, wherein in the second status, performing the GGSN re-allocation includes a mobile station redirect initiation with an SGSN Routing Area Update procedure.

9. The resource re-allocation method of claim 8, wherein the mobile station redirect initiation with the SGSN Routing Area Update procedure is performed by the original GGSN.

10. The resource re-allocation method of claim 9, wherein the mobile station redirect initiation with the SGSN Routing Area Update procedure performed by the original GGSN comprises:

step 1, the GGSN controller collecting GGSN information and deciding to perform a mobile station redirect procedure;

step 2, the GGSN controller generating a list of mobile stations and their corresponding GGSNs and sending MS Redirect Requests to the original GGSN;

step 3, the original GGSN receiving the MS Redirect Request from the GGSN controller and getting a list of mobile stations to be redirected;

step 4, the original GGSN sending a Transfer Packet Data Protocol (Transfer PDP) Context Request to the new GGSN and buffering packets from the original SGSN;

step 5, a mobile station sending a Routing Area Update Request to the new SGSN to initial the SGSN Routing Area Update procedure;

step 6, the new SGSN sending a SGSN Context Request to the original SGSN after receiving the Routing Area Update Request, and taking over the mobile station's services after receiving a SGSN Context Response from the original SGSN and returning a SGSN Context Acknowledge to the original SGSN, thereby completing the SGSN Routing Area Update procedure;

step 7, the new GGSN receiving the Transfer PDP Context Request and sending a Proxy ARP to external routers to update mapping tables of associated MAC and IP addresses;

step 8, the new SGSN sending a PDP Context Request to the original GGSN after receiving the SGSN Context Acknowledge;

step 9, repeatedly sending the PDP Context Request to the new GGSN and the Proxy ARP to the external routers until the new GGSN responds a Transfer PDP Context Response to the original GGSN;

step 10, the original GGSN sending a Create PDP Context Response to the new SGSN and starting to forward packets of the mobile station to the new GGSN;

step 11, the new SGSN updating GGSN-in-Use field in its PDP context; and step 12, the original GGSN initiating the mobile station redirect being completed.

11. The resource re-allocation method of claim 8, wherein the mobile station redirect initiation with the SGSN Routing Area Update procedure is performed by the original SGSN.

12. The resource re-allocation method of claim 11, wherein the mobile station redirect initiation with the SGSN Routing Area Update procedure performed by the original SGSN comprises:

step 1, the GGSN controller collecting GGSN information and deciding to perform a mobile station redirect procedure;

step 2, the GGSN controller generating a list of mobile stations and their corresponding GGSNs and sending GGSN Re-allocation Requests to the original SGSN;

step 3, the original SGSN receiving the GGSN Re-allocation Request from the GGSN controller;

step 4; a mobile station sending a Routing Area Update Request to the new SGSN to initial the SGSN Routing Area Update procedure;

step 5, after the new SGSN receiving the Routing Area Update Request, the original SGSN sending a SGSN Context Request to the new SGSN to obtain all information of the mobile station;

step 6, the original SGSN sending the latest Packet Data Protocol (PDP) context to the new GGSN when the original GGSN does not send a Transfer PDP Context Request;

step 7, the original GGSN buffering packets from the new SGSN when the original GGSN sends a Transfer PDP Context Request;

step 8, the new GGSN sending a Proxy ARP to external routers to update mapping tables of associated MAC and IP addresses;

step 9, the original GGSN receiving a SGSN Context Response from the new SGSN and returning a SGSN Context Acknowledge to the new SGSN, thereby completing the SGSN Routing Area Update procedure;

step 10, the new SGSN sending a Create PDP Context Request to the original GGSN;

step 11, the original GGSN sending a Create PDP Context Response to the new SGSN after receiving the Create PDP Context Request and starting to forward packets of the mobile station; and step 12, the original SGSN completing initiation of the mobile station redirect.

13. The resource re-allocation method of claim 11, wherein if the SGSN Routing Area Update is requested before performing the GGSN re-allocation, the mobile station redirect initiation with the SGSN Routing Area Update procedure performed by the original SGSN comprises:

step 1, the GGSN controller collecting GGSN information and deciding to perform a mobile station redirect procedure;

step 2, a mobile station sending a Routing Area Update Request to the new SGSN to initiate the SGSN Routing Area Update procedure;

step 3, after the new SGSN receiving the Routing Area Update Request, the original SGSN sending a SGSN Context Request to the new SGSN to obtain all information of the mobile station;

step 4, the original GGSN receiving a SGSN Context Response from the new SGSN and returning a SGSN Context Acknowledge to the new SGSN, thereby completing the SGSN Routing Area Update procedure;

step 5, the GGSN controller generating a list of mobile stations and their corresponding GGSNs and sending a GGSN Re-allocation Request to the original SGSN;

step 6, the original SGSN receiving the GGSN Re-allocation Request from the GGSN controller and forwarding it to the new SGSN;

step 7, if the new SGSN does not have the latest PDP context after receiving the GGSN Re-allocation Request, the new SGSN sending a Create Packet Data Protocol (Create PDP) Context Request to the new GGSN in order to obtain and send the latest routing information to the new GGSN and external routers;

step 8, the original GGSN sending a Transfer PDP Context Request to the new GGSN and starting to buffer packets from the new SGSN;

step 9, the new GGSN sending a Proxy ARP to the external routers to update mapping tables of associated MAC and IP addresses;

step 10, the new GGSN returning a Create PDP Context to the new SGSN and starting to forward packets of the mobile station;

step 11, the original SGSN completing initiation of the mobile station redirect.

* * * * *

UNITED STATES PATENT AND TRADEMARK OFFICE
CERTIFICATE OF CORRECTION

PATENT NO.        : 7,457,270 B2                                            Page 1 of 1
APPLICATION NO.   : 10/215169
DATED             : November 25, 2008
INVENTOR(S)       : Shiao-Li Tsao It is certified that error appears in the above-identified patent and that said Letters Patent is hereby corrected as shown below:

On the Title Page, Item (73) (Assignee), Line 2, Delete "Hsinchu (TW)" and insert -- Hsinchu 310, Taiwan, R.O.C. --, therefore.

Signed and Sealed this

Seventeenth Day of February, 2009

JOHN DOLL
*Acting Director of the United States Patent and Trademark Office*